United States Patent [19]
Tavallaei et al.

[11] Patent Number: 6,134,579
[45] Date of Patent: Oct. 17, 2000

[54] SEMAPHORE IN SYSTEM I/O SPACE

[75] Inventors: Siamak Tavallaei, Spring; Jeffrey S. Autor, Houston, both of Tex.

[73] Assignee: Compaq Computer Corporation, Houston, Tex.

[21] Appl. No.: 08/911,842

[22] Filed: Aug. 15, 1997

[51] Int. Cl.[7] .................................................. G06F 9/00
[52] U.S. Cl. ............................................................ 709/100
[58] Field of Search ..................................... 395/674, 842, 395/680, 678, 850; 709/104, 108, 300, 100, 102, 103

[56] References Cited

U.S. PATENT DOCUMENTS

| | | | |
|---|---|---|---|
| 4,162,529 | 7/1979 | Suzuki et al. | 364/200 |
| 4,394,725 | 7/1983 | Bienvenu | 395/676 |
| 4,725,946 | 2/1988 | Prange | 395/676 |
| 5,487,154 | 1/1996 | Gunji | 395/842 |
| 5,590,378 | 12/1996 | Thayer | 395/850 |
| 5,634,038 | 5/1997 | Saitoh | 395/490 |

FOREIGN PATENT DOCUMENTS 0032182  7/1981  European Pat. Off. .

OTHER PUBLICATIONS

"Data processor Real Time Input Output/Channel"; Anonymous Jan. 1977; IBM Technical Disclosure Bulletin, vol. 19, No. 8, Jan. 1977, pp. 1–7.

"Re: What's the difference between locks and semaphores?"; Jim Barton (jmb@patton.wpd.sgi.com) Jan. 2, 1991; Accessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linuxwww.db.erau.edu/LPG/node47.html.

*Primary Examiner*—Majid A. Banankhah
*Attorney, Agent, or Firm*—Fletcher, Yoder & Van Someren

[57] ABSTRACT

A computer system utilizing multiple processes includes a semaphore for controlling exclusive access of a single process to a selected resource. The semaphore is implemented in the system input/output and controlled, at least in part, by an application specific integrated circuit (ASIC). When a process is attempting to acquire an I/O resource, a read is sent to the semaphore. If the resource is available the semaphore will have a first value, and the semaphore will return that first value to the process indicating that the process has acquired the resource. The ASIC will then change the semaphore value to a second value. If the resource is not available the semaphore will have the second value, and the semaphore will return the second value to the process indicating that the resource is not available.

5 Claims, 4 Drawing Sheets

SEMAPHORE IN SYSTEM I/O SPACE

BACKGROUND OF THE INVENTION

1. Field of the Invention

The present invention relates to computer systems, and more particularly, but not by way of limitation, to computer system utilizing semaphores implemented in the system I/O and controlled, at least in part, by an application specific integrated circuit also implemented in the system I/O.

2. Description of Related Art

Networks serve the purpose of connecting many different personal computers (PCs), workstations, or terminals to each other, and to one or more host computers, printers, file servers etc., so that expensive computing assets, programs, files and other data may be shared among many users.

In a network utilizing a client/server architecture, the client (personal computer or workstation) is the requesting machine and the server is the supplying machine, both of which may preferably be connected via the network, such as a local area network (LAN), wide area network (WAN) or metropolitan area network (MAN). This is in contrast to early network systems that utilized a mainframe with dedicated terminals.

In a client/server network, the client typically contains a user interface and may perform some or all of the application processing and as mentioned above can include personal computer or workstations. The server in a client/server network can be high-speed microcomputers or minicomputers and in the case of a high-end server can include multiple processors and mass data storage such as multiple CD-ROM drives and multiple hard drives, preferably with redundant array of inexpensive disk (RAID) protection. An exemplary server such as a database server maintains the databases and processes requests from the client to extract data from or update the database. An application server provides additional business processing for the clients. The network operating system (NOS) together with the database management system (DBMS) and transaction monitor (TP monitor) are responsible for the integrity and security of the server.

Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use.

As can be appreciated, many of businesses are highly dependent upon the availability of their client/server network systems to permit essential network services and functions to be carried out. As client/server network systems become increasingly essential to the everyday operations of such businesses, additional steps need to been taken in the design and construction of the server in the client/server network system to ensure its continuous availability to the clients. That is to say, in the design and construction of a server, steps need to be taken to ensure that the server can be operated with little or no downtime.

It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removability of modular components allows for better overall serviceability of the computer system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-pluggability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician.

Component redundancy has also been recognized as an important design consideration in ensuring that a server will operate with little or no downtime. Essentially, component redundancy is typically provided in a system to better ensure that at least one of the redundant components is operable, thereby minimizing the system down time. With component redundancy, at least two components are provided that can perform the same function, such that if one of the components becomes faulty for some reason, the operation fails over to the redundant component. When at least one of the redundant components is operable, continued operation of the computer system is possible even if others of the redundant components fail. To further enhance reliability and serviceability, redundant components have been made hot pluggable.

Dynamic reconfiguration of a server system can also be accomplished by providing upgradable modular components therein. As can be readily appreciated, this objective can be accomplished by the addition or substitution of components having different circuits, preferably updated or upgraded, disposed therewithin. When components are redundant and hot pluggable, reconfiguration of the server is often possible without taking the server offline.

Another important design aspect with respect to providing redundant and hot pluggable components in a server system is to ensure and maintain a safe working environment while the server is operating and being repaired or upgraded. Accordingly, when the system components are swapped or upgraded, the exposure of hot connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic sub-systems thereof. In existing client/server network systems it is often difficult to obtain, in a timely manner, important diagnostic data and information corresponding to a component failure in order to facilitate the quick serviceability of the server. Therefore, it can be appreciated that the more information that can be readily provided to locate a defective component or problem with the server, the better the optimization of the amount of time the server is up and running.

Although multiprocessors enhance the performance of the computer system, the multiple processors also create additional problems. One of the problems that has been encountered with multiprocessor systems occurs when more than one of processors attempts to access a shared hardware or software resource at the same time. One common solution to this problem is through the utilization of system memory semaphores. In general, semaphores are counters used to control access to shared resources by multiple processes. Semaphores are commonly used as a locking mechanism to prevent processes from accessing a particular resource while another process is performing operations on it.

An example of existing semaphore use is illustrated in the computer system 300 depicted in FIG. 3. As depicted the computer system 300 includes: CPUs 310 and 312; system memory 314, which includes semaphore 318; and system input/output (I/O) 316. The components of computer system 300 are coupled in communication through common bus 320. In operation, for example, if CPU 310 wants to access a resource of system I/O 316, if first much check the status of the desired resource by sending a read command over bus 320 to the associated semaphore 318 in the system memory. The semaphore 318 returns the status information back to CPU 310. If the desired resource is available, CPU 310 sends a write command to semaphore 318 to change the status of semaphore 318 from available to unavailable. To prevent another process or processor from checking the status of semaphore 318 concurrent with CPU 310, prior to sending the read command, CPU 310 will lock bus 320 until the read, write routine is completed.

As can be appreciated, not only does locking bus 320 prevent another processor or master from accessing the particular semaphore, but it also prevents the other processors from communicating with the other devices on the bus. As further illustrated in FIG. 3, the semaphore 318 is implemented in the system memory as is historically done with most semaphore applications. Although application software can communicate with the system memory very readily, there are many other drivers, such as a ROM BIOS function call,and processes in Systems Management Interrupt (SMI) mode that can not.

Generally, communicating with the system memory space requires protection, and often protected operating systems implement disjointed memory spaces and give disjointed memory spaces to multiple devices. Therefore, it is problematic to create a common area for multiple processes to communicate by setting a flag. This is because the common area cannot be protected by the standard method of protection provided and required by the operating system. The standard method of protection allows a particular process to access only a particular memory region. Therefore, the only way to create a common area for the multiple processes is to intermingle memory regions, which can cause numerous problems.

SUMMARY OF THE INVENTION

The present invention overcomes the above identified problems as well as other shortcomings and deficiencies of existing technologies by providing a computer system having a system input/output implemented semaphore.

The present invention further provides a computer system with multiple processes that uses a semaphore for controlling exclusive access by one of the processes to a selected system I/O resource. The semaphore is implemented in the system input/output and controlled, at least in part, by an application specific integrated circuit (ASIC). When one of the processes is attempting to acquire an I/O resource, a read is sent from the processes to the semaphore. If the resource is available the semaphore will have a first value, and the semaphore will return that first value to the processes indicating that the processes has acquired the resource. The ASIC will then change the semaphore value to a second value such that to all subsequent reads by other processes the semaphore will indicate that the resource has already been acquired and is not available. If the resource is not available when the read is received the semaphore will have the second value, and the semaphore will return the second value to the processes indicating that the resource is not available.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
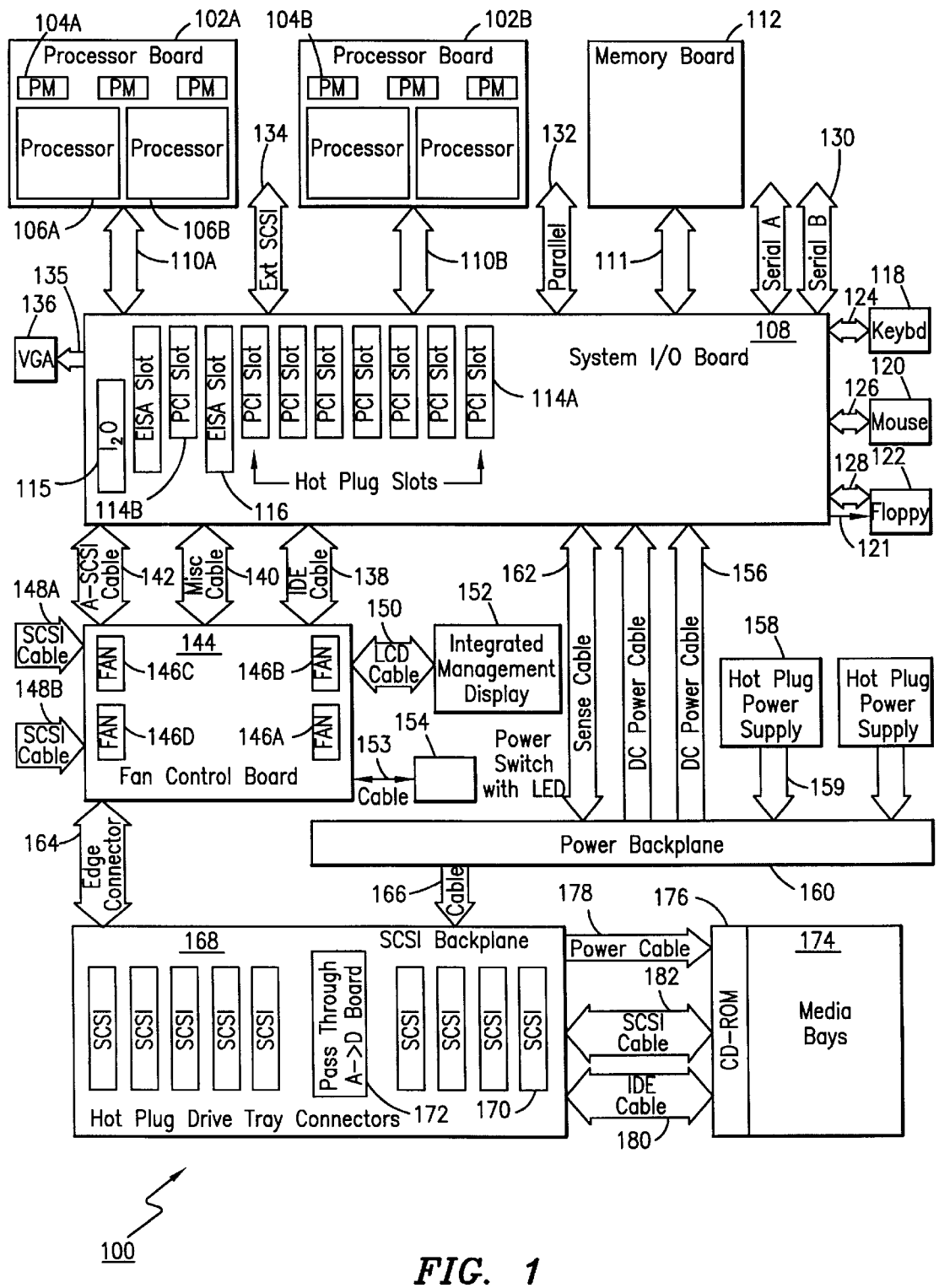
FIG. 1 illustrates a board-level block diagram of an exemplary embodiment of a computer system in which the teachings of the present invention may be utilized.

Referring now to the drawings wherein like or similar elements are designated with identical reference numerals throughout the several views, and wherein the various elements depicted are not necessarily drawn to scale, and, in particular, to FIG. 1, there is shown a board-level block diagram of a presently preferred exemplary computer system 100 in which the teachings of the present invention may be beneficially employed. The exemplary computer system 100 may comprise multiple processor boards, for example, processor boards 102A and 102B, each of which, in turn, may include a plurality of processors such as, for example, processors 106A and 106B. The processor boards 102A and 102B may also include, respectively, multiple power modules, such as power modules 104A and 104B which are shown herein.

Each of the processor boards 102A and 102B is connected to a system board 108 via a suitable bus connector or slot, for example, bus connector slots 110A and 110B, respectively. In the exemplary computer system 100, the presently preferred bus connector slots are compatible with the Gunning Transistor Logic (GTL) bus protocol. Furthermore, as will be seen hereinbelow, the system board 108 in the exemplary embodiment also includes multiple input/output (I/O) subsystems. Accordingly, the system board 108 may also be interchangeably referred to as the system I/O board in the following Detailed Description.

Continuing to refer to FIG. 1, a memory board 112 is also coupled to the system board 108 through a memory connection slot 111. In the exemplary computer system 100, the memory board 112 may comprise several dual in-line memory modules (DIMMs) having known sizes, for example, 8MB, 16MB, 32MB, 64MB, 128MB, and 256MB. As can be appreciated by those skilled in the art, the memory provided with the memory board 112 may be organized in any known fashion.

The exemplary system board 108 includes multiple expansion slots, suitable for different bus types. Further, these expansion slots may be selectively provided with "hot-pluggable" capability. One of ordinary skill in the art can readily appreciate that the ability to replace an expansion card (not shown), receivable at an expansion slot, without powering down the system 100 contributes to rendering the system 100 a "zero downtime" system with high availability. In the exemplary computer system 100, the multiple expansion slots comprises those that may be operable with the Peripheral Component Interconnect (PCI) bus type (for example, slots 114A and 114B) as well as those slots that are compatible with the Extended Industry Standard Architecture (EISA) bus type (for example, slot 116). It should be appreciated that either categories of the expansion slots may be provided with hot pluggability. The system board 108 may additionally comprise serial port connections, for example, serial connector 130, parallel port connection, for example, parallel connector 132, and a connector 134 compatible with the Small Computer System Interface (SCSI) bus type.

Still continuing to refer to FIG. 1, the system board 108 is coupled to a host of input and output devices via cables, for example, a keyboard 118 with cable 124, a pointing device 120 with cable 126, a flexible disk drive 122 with 128, and a monitor 136 with cable 135. As can be seen, a separate power connection path 121 is also provided between the flexible disk drive 122 and the system board 108.

The exemplary system board 108 may also comprise an "intelligent I/O" ($I_2O$) bus connector 115 for accelerating the performance of selected PCI-compatible expansion slots. A fan control board 144 is coupled to the system board 108 through a SCSI cable 142, a miscellaneous cable 140 and an Integrated Drive Electronics (IDE) cable. The fan control board 144 includes multiple fan connectors, for example, fan connector 146A–146D, which fan connectors are used for coupling hot-pluggable fans. The fan control board 144 may be provided with additional SCSI-compatible cables, for example, cables 148A and 148B, a display cable 150 coupled to an integrated management display (IMD) unit 152, and a power switch cable 153 coupled to a power switch 154.

The miscellaneous cable connector 140, which joins the fan control board 144 with the system board 108, preferably contains signals generated by the IMD unit 152, various interlock signals provided by an interlock cabling system (not shown) interconnecting various boards, temperature signals, fan control signals, audio signals, et cetera.

Still referring to FIG. 1, the system board 108 of the exemplary computer system 100 is coupled to a power backplane 160 via a sense cable 162 and at least one DC power cable 156. Redundant hot pluggable power supply units 158 are connected to the power backplane 160 through hot plug power connectors 159. Both the fan control board 144 and the power backplane 160 are coupled to a SCSI backplane 168 via an edge connector 164 and a power-SCSI backplane cable 166, respectively. The SCSI backplane includes multiple SCSI drive tray connectors, for example tray connector 170. In the exemplary computer system 100, the SCSI drive tray connectors are also provided with the hot plug capability in order to enhance the high availability aspect thereof. A media power cable 178 connects the SCSI backplane 168 to a media bay 174 and CD-ROM drive 176. A media SCSI cable 182 and an IDE cable 180 are also disposed between the SCSI backplane and the CD-ROM/media bay 176/174.

Figure 2:
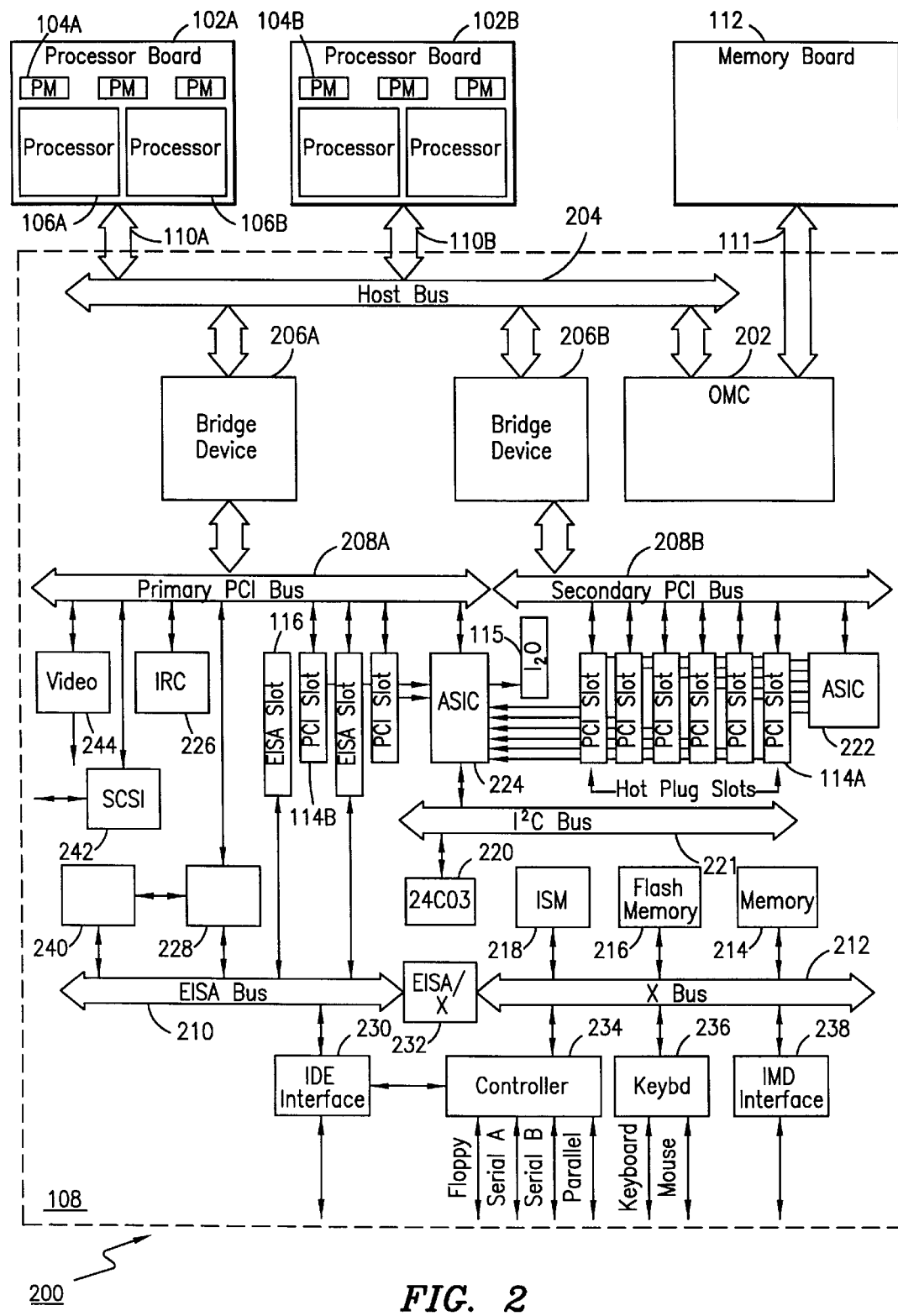
FIG. 2 illustrates a diagram of the system I/O board as similarly presented in FIG. 1.
Figure 3:
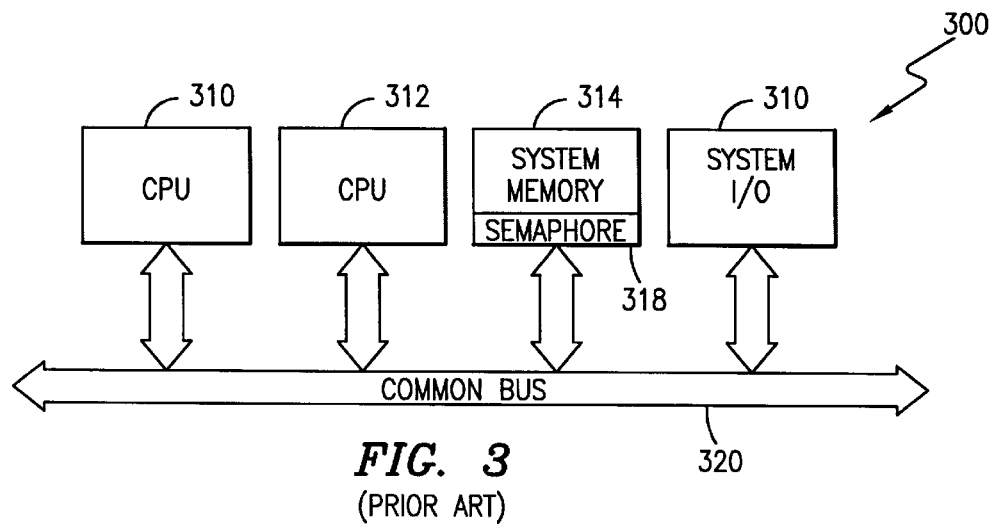
FIG. 3 illustrates a block diagram of a prior art computer system utilizing semaphores in the system memory (described hereinabove)

Referring now to FIG. 2, there is shown a diagram 200 of the system I/O board 108 provided in the exemplary computer system 100, wherein the teachings of the present invention may be practiced. As described in the foregoing with reference to FIG. 1, the processor boards 102A and 102B are connected to the system board 108 via bus connector slots 110A and 110B, respectively. The bus connector slots 110A and 110B are, in turn, coupled to a host bus 204 disposed on the system board 108. In the preferred exemplary embodiment, the host bus 204 uses Gunning Transistor Logic for enabling high-speed, low-power operation. As is known in the art, the GTL voltage swings between logic high and logic low are typically lower than those for the Complimentary Metal Oxide Semiconductor (CMOS) logic or the Transistor-to-Transistor Logic (TTL). In addition to the bus connector slots 110A and 110B, the following devices are disposed on the host bus 204: a memory controller 202, a first bus-to-bus bridge device 206A and a second bus-to-bus bridge device 206B. The bridge device 206A is provided for bridging between the host bus 204 and a primary PCI bus 208A, whereas the bridge device 206B is provided for bridging between the host bus 204 and a secondary PCI bus 208B. Coupled to the memory controller 202 is the memory board 112 via the memory board connection slot 111.

In addition to the bridge device 206A for coupling to the host bus 204, the primary PCI bus 208A is connected to the following devices: a video controller 244, a PCI-EISA bridge 228, a SCSI controller 242, an Integrated Remote Console (IRC) controller 226, an application specific device 224, and at least one expansion slot 114B.

In a presently preferred exemplary embodiment of the computer system 100, the IRC controller 226 is provided as a "hidden" device that resides on the primary PCI bus 208A. The following functionality of the IRC controller 226 includes, inter alia, the following: It examines and records video activity that is passed to firmware through the system management interrupt (SMI). It also allows a remote user to reboot or power-cycle the computer system 100. Further, the IRC controller 226 provides for remote modification such that a remote user can modify any IRC configuration or user setting, preferably after proper authentication.

Application specific device 224 is preferably provided as an application specific integrated circuit (ASIC) that operates as a latching system for signals that indicate the health and operability of various devices and system within the exemplary computer system 100. Its functionality includes, for example, semaphore control, bus arbitration, Inter-Integrated Circuit ($I^2C$) bus master controller function, bus utilization monitoring, semaphore logic and timer functions. It can be seen that the device 224 is coupled to an $I^2C$ bus 221 and the intelligent I/O bus connector 115 in order to facilitate some of these functions. Device 224 is described in more detail herein below with reference to FIG. 4.

Continuing to refer to FIG. 2, the secondary PCI bus 208B is coupled to a multiple of expansion slots, for example, slot 114A, which are preferably provided with the hot plug capability. An application specific device 222 is also coupled to the secondary PCI bus 208B to provide hot plug slot control and PCI bus arbitration.

The I²C bus 221, for which bus the device 224 provides the master controller functionality, is coupled to multiple memory devices although only one such device, for example, EEPROM 220 is shown. In addition, in the preferred exemplary computer system 100, the I²C bus 221 goes to a sense connector (not shown), the processor board bus connector slots 110A and 110B, and the memory board connector slot 111.

The PCI-EISA bridge 228, disposed between an EISA bus 210 and the primary PCI bus 208A, preferably contains, for example, a PCI interface, PCI arbiter, EISA interface, EISA data swap logic, and an interface to an EISA System Component (ESC) 240. In the exemplary embodiment, the ESC 240 preferably includes an EISA bus controller, a Direct Memory Access (DMA) controller, an EISA arbiter, at least one interrupt controller which may be programmable, several timers and support logic.

In addition to the expansion slots, for example, slot 116, the EISA bus 210 is connected to the ESC 240, a bridge 232 to an 8-bit buffered EISA bus 212 (also referred to as the X bus), and an IDE interface 230. The X bus is typically used by devices that have low output drive, and cannot sink the typical current (at around 24 mA) required by the standard EISA bus type. In the exemplary computer system 100, the following devices are typically provided on the X bus 212: a flash memory 216 for storing system BIOS and system management BIOS codes, an IMD interface 238, memory 214—preferably provided as nonvolatile RAM, an Integrated System Management (ISM) device 218, a keyboard controller 236 for interfacing the keyboard 118 and pointing device 120 (both depicted in FIG. 1), and a peripheral controller 234—preferably provided as an ASIC for controlling such devices as flexible disk drives, parallel ports, and serial ports.

Figure 4:
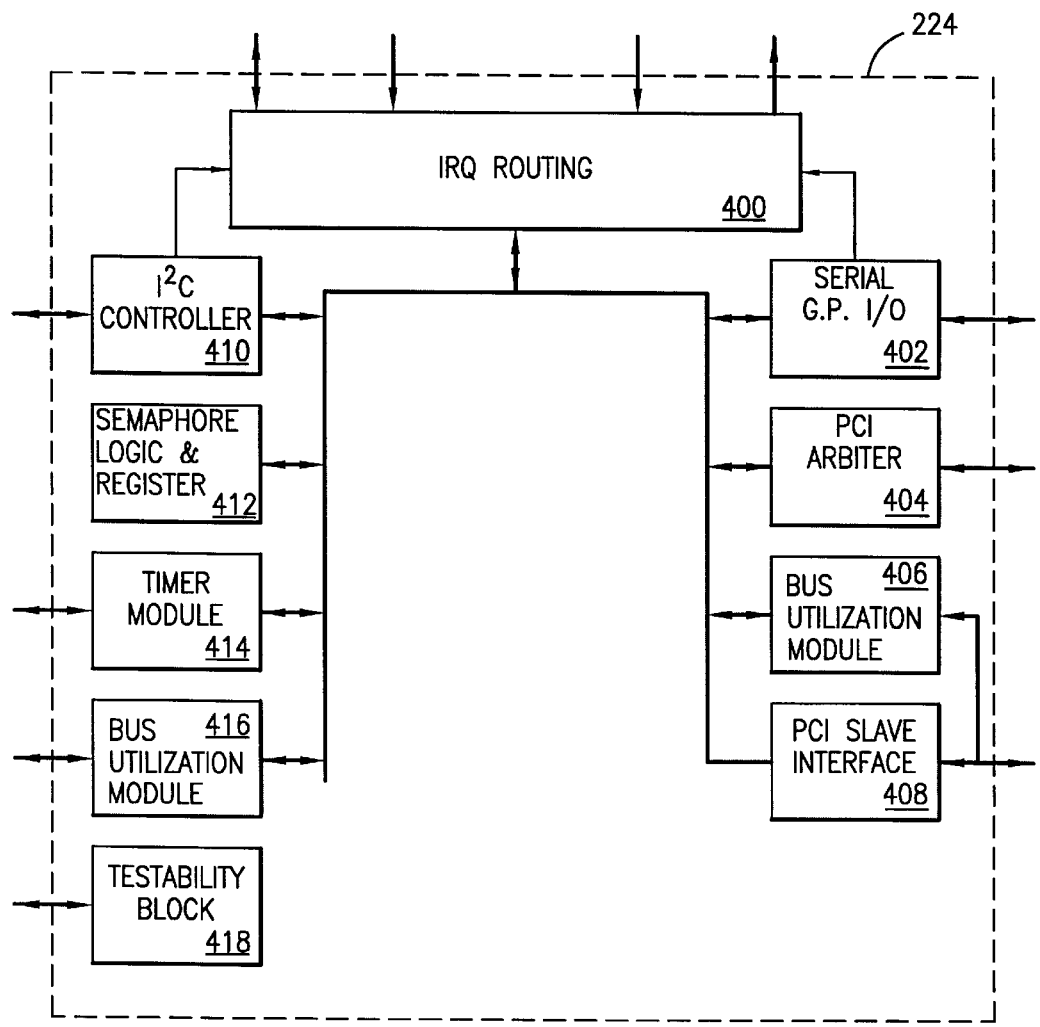
FIG. 4 illustrates a block diagram of an application-specific device used in the presently preferred exemplary embodiment of the computer system in which the teachings of the present invention may be embodied.

Referring now to FIG. 4, a block diagram of the application-specific device 224 is shown. As has been remarked in the reference to FIG. 2, the device 224 is preferably responsible for semaphore control, interrupt routing, the I²C bus control, PCI bus utilization, et cetera. The various features of the presently preferred exemplary embodiment of the device 224 are preferably accessed via a PCI slave interface 408. The internal registers of the device 224 are preferably clocked from a clock associated with the PCI slave interface 408, although in the exemplary embodiment, a testability block 418 responsible at least in part for the Boundary Scan logic and a bus utilization module 406 may be excepted from this docking feature.

An IRQ routing block 400 is provided for handling at least in part, various PCI-associated interrupt requests (IRQs). One or more bus utilization modules (for example, modules 406 and 416) may be provided in the device 224 that are responsible for reporting the aggregate bus utilization and aggregate data transfer for the PCI buses 208A and 208B (shown in FIG. 2). These modules are preferably connected to the FRAME_, IRDY_and TRDY_signals associated with the PCI buses 208A and 208B. One or more bus utilization registers in the modules 406 and 416 report Bus_Not_Idle time (that is Bus_Busy time) on the relevant PCI bus in PCI clock cycles by observing the FRAME_and IRDY_signals. One or more data transfer phase registers in these modules report the number of PCI clock cycles during which data is transferred on the relevant PCI bus.

Continuing to refer to FIG. 4, a PCI arbiter 404 is provided in the device 224 for facilitating PCI bus arbitration, preferably by using a Round-Robin algorithm. Each master or master-target on the PCI buses 208A and 208B is connected to the PCI arbiter 304 by its GNT_and REQ_signals. A serial, general purpose I/O module 402, an I²C controller 410, and a semaphore module 412 are also provided in the presently preferred exemplary embodiment of the device 224. The serial I/O module 402 is designed to shift preferably 32 bits of data in both directions. External logic circuitry (not shown) may be provided for the serial-to-parallel conversion for serially shifted data. The I²C controller 410 preferably provides a two-pin serial interface which may be connected to a variety of slave peripherals, including, for example, temperature sensors, analog-to-digital converters, non-volatile memories, et cetera. The two-pin serial interface, which controls bi-directional, serial data transmissions, includes a serial clock signal and a serial data signal.

In addition, a general purpose timer module 414 is also provided in the device 224, which timer module may be utilized for practicing the teachings of the present invention. The timer module 414 is preferably a programmable 32-bit timer that is clocked by the CLK signal associated with the PCI slave interface 408.

Referring now to semaphore module 412. In this exemplary embodiment it is preferred that semaphore module 412 include the semaphore registers and semaphore control logic, although it is contemplated that the semaphore registers could be implemented elsewhere in the system I/O. The semaphore register includes 8 bits of undedicated registers for software use. Each bit of the semaphore register is at a byte boundary to support the processor instruction set. The semaphore logic of semaphore module 412 of ASIC 224 controls or implements certain functions of the semaphore. The semaphore is acquired by a processor to gain exclusive access to (or reserve) selected resources.

Generally, a semaphore is used to prevent simultaneous access to a non-reentrant hardware or software resource. However, traditional semaphores have been implemented as software constructs, and it has been assumed that all access to the semaphored hardware or software resource would be performed within the context of the operating system.

However, as in this exemplary embodiment of computer system 100, the computer system 100 is using a ROM BIOS and support for the Systems Management Interrupt (SMI), so it is possible for access to a hardware source to be performed outside of the context of the operating system. Therefore, these accesses cannot be protected by traditional semaphores, as they have no method for using the operating system's facilities.

The present invention however provides a sempahore 412 of ASIC 224 implemented in the system I/O 108. This is outside of the operating system's architecture and allows usage of the semaphore by any process, regardless of its context within the operating system. For example, a process may be accessing a serialized input/output hardware device using a function call to the ROM BIOS. Another process could interrupt the first process, and access the same hardware using the ROM BIOS function call. Semaphore 412 is used to protect the device so that the second process cannot alter the state of the device, such that when the first process resumed, it will be able to complete its operation successfully.

Figure 5:
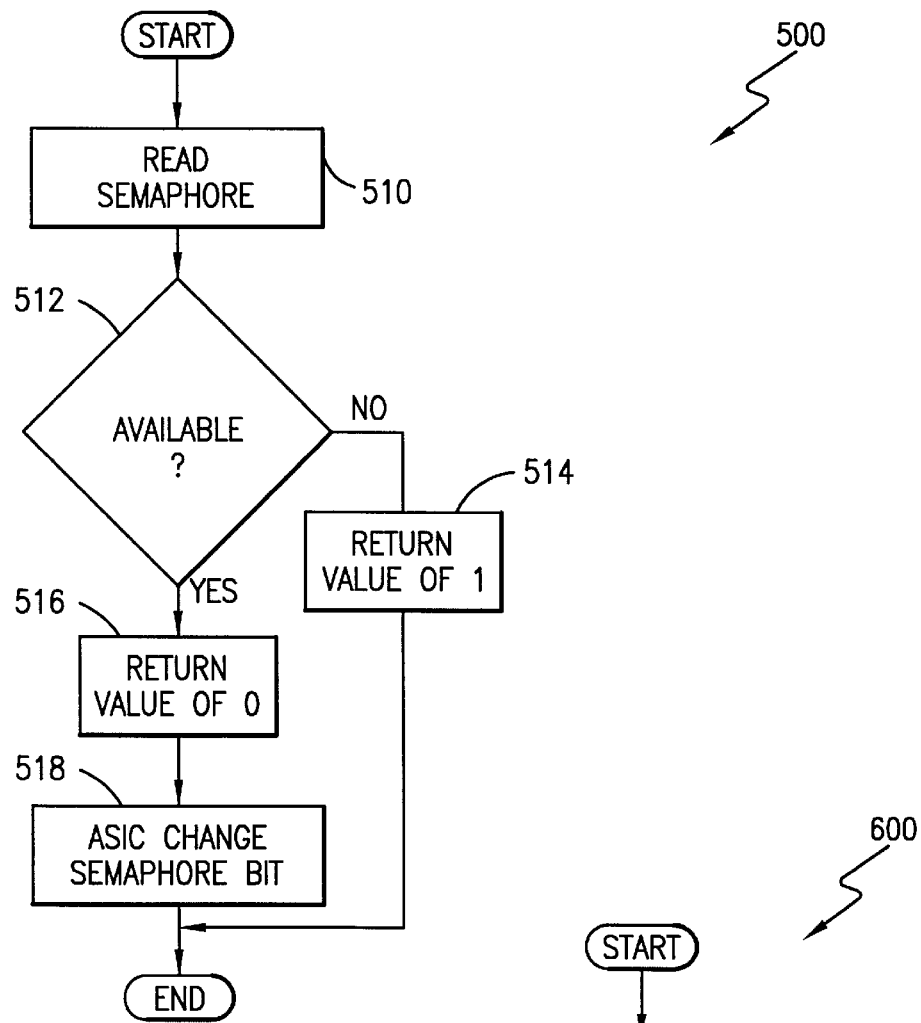
FIG. 5 illustrates a block flow diagram depicting the acquisition of an I/O resource by a process in accordance with the principles of the present invention.

Referring now to FIG. 5, there is illustrated a flow diagram 600 illustrating the acquisition of an I/O resource in accordance with the principles of the present invention. When, for example, a process needs to gain exclusive access to a resource, such as an I/O resource, as indicated by step 510, the process sends a read command to the semaphore associated with the particular I/O resource.

As indicated by step 512, a determination is then made as to whether the particular I/O resource is available. In this exemplary embodiment of the present invention, the determination of whether the I/O resource is available depends upon the value of the semaphore. If the semaphore has a value of value of 1 (one) the determination is made that the resource is not available, and the 'no' path is followed to step 514 where the semaphore returns a value of 1 (one) to the process. If the semaphore has a value of 0 (zero), the determination is made that the resource is available, and the 'yes' path is followed to step 516, wherein the semaphore returns a value of 0 (zero) to the process. This indicates to the process that it has acquired the particular resource. Subsequent to step of 516, as indicated by step 518, in response to the read command and in response to the semaphore being available, the semaphore logic flips the semaphore from 0 (zero) to a 1 (one), whereby all subsequent reads of the semaphore will return a 1 (one) indicating that the particular resource is unavailable.

It is contemplated that other values could be used for the semaphore for indicating that a particular resource is available, and in particular the values could be set up such that semaphore 412 could be used as a semaphore counter.

Figure 6:
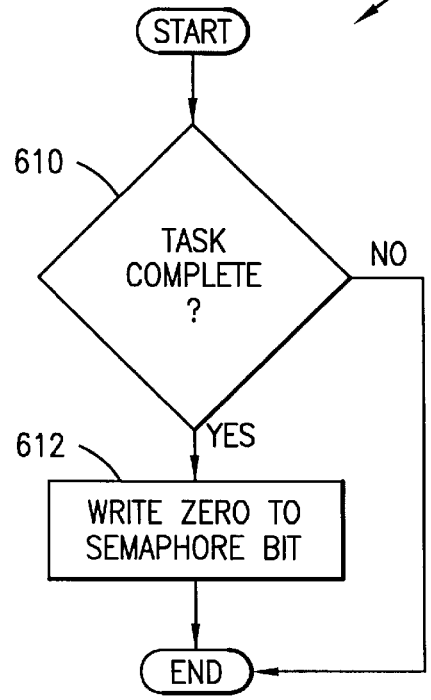
FIG. 6 illustrates a block flow diagram depicting the reset of the semaphore.

Referring now to FIG. 6, there is illustrated a flow block diagram 600 illustrating the reset of the semaphore in accordance with the principles of the present invention. As illustrated by step 610, a determination is made as to whether the process has completed it task and no longer needs exclusive access the I/O resource. If the determination is 'no' the no path is followed and the procedure ends. If the determination is made that the process has completed its task, the 'yes' path is followed to step 612. As indicated by step 612, the process then send a write command to the semaphore to change it from a 1 (one) to a 0 (zero), thereby indicating that the resource is now available.

Based upon the foregoing, it should now become apparent to those skilled in the art that the I/O implemented semaphore provided in accordance with the teachings of the present invention significantly enhance the high availability and reliability aspects of various computer systems. It should be appreciated that the present invention provides a highly effective solution to the problems created through the use of system memory implemented semaphores. Moreover, the presently preferred exemplary embodiment of the present invention also provides a semaphore, at least in part, controlled by an ASIC, which among other things, reduces the amount of data bus traffic.

Although a preferred embodiment of the apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system comprising:

a plurality of processes;

a system input/output (I/O) coupled to each of said plurality of processes, said system I/O connecting a plurality of devices to said system I/O via interface slots within said system I/O, each of said plurality of devices accessible by each of said plurality of processes;

said system I/O further including a plurality of semaphores, one for each of said plurality of devices connected to said system I/O, for indicating the status of corresponding ones of said plurality of devices, each of said plurality of semaphores responsive to a check signal received from one of said plurality of processes and configured to output to said one of said plurality of processes a first value when the semaphore's corresponding device is available and a second value when the semaphore's corresponding device is unavailable; and said system I/O further including an ASIC for controlling each of said plurality of semaphores within said system I/O, said ASIC further for changing the value of particular ones of said plurality of semaphores from said first value to said second value in response to both said particular semaphore receiving a check a signal from at least one of said plurality of processes and said particular semaphore having said first value.

2. The computer system as recited in claim 1, wherein said ASIC includes semaphore control logic.

3. The computer system as recited in claim 2, wherein said ASIC is further for communicating the value of said semaphore to one of said plurality of processes in response to said semaphore receiving a check signal from said one of said plurality of processes.

4. In a computer system having a plurality of processes and a plurality of devices accessible by each of the plurality of processes, a method of ensuring exclusive ownership of particular ones of the plurality of devices by one of the plurality of processes, said method comprising the steps of:

providing a plurality of semaphores at a system level I/O, each of the plurality of semaphores associated with corresponding ones of the plurality of devices, each of the plurality of devices connected to the system level I/O via interface slots within the system level I/O;

providing an ASIC at the system level I/O, the ASIC for controlling each of the plurality of semaphores to indicate a status of the corresponding ones of the plurality of devices;

sending a check signal from a first of the plurality of processes to a particular one of the plurality of semaphores associated with the status of a corresponding one of the plurality of devices;

reading the value of the particular semaphore, whereupon;

if the value of the particular semaphore is a first value indicating that the corresponding device is available, returning the first value to the first of the plurality of processes; and changing the first value of the particular semaphore to a second value with the ASIC thereby indicating that the corresponding device is no longer available; and else if the value of the particular semaphore is the second value indicating that the corresponding device is unavailable and returning the second value to the first of the plurality of processes.

5. A computer system, comprising:

a plurality of processes coupled to a system level input/output (I/O);

a plurality of devices connected to said system level I/O via interface slots within said system level I/O, each of said plurality of devices accessible by each of said plurality of processes;

an ASIC within said system level I/O, said ASIC configured to enable a determination of control of each of said plurality of devices within s aid system level I/O;

said ASIC including a plurality of semaphores, one for each of said plurality of devices, for indicating an availability of corresponding ones of said plurality of devices, said ASIC further for communicating the semaphore associated with one or more of the plurality of devices in response to a check signal from one or more of the plurality of processes; and wherein said plurality of processes include operating system processes and system BIOS processes that attempt to access said plurality of devices, and wherein said ASIC is accessible by said operating system processes and said system BIOS processes.

* * * * *